Patented Nov. 28, 1933

1,937,285

UNITED STATES PATENT OFFICE 1,937,285

CATALYST FOR THE PREPARATION OF ESTERS

Jerome Martin, Terre Haute, Ind., and Ignace J. Krchma, Baltimore, Md., assignors to Commercial Solvents Corporation, Terre Haute, Ind., a corporation of Maryland No Drawing. Original application May 16, 1928, Serial No. 278,334, now Patent No. 1,817,899. Divided and this application August 13, 1930. Serial No. 475,118

9 Claims. (Cl. 23—237)

Our invention relates to a method of preparing esters by passing alcohols over suitable catalysts. More particularly, our process pertains to an improved method of obtaining esters such as ethyl acetate, propyl proprionate, butyl butyrate, ethyl butyrate, etc., from the corresponding alcohols or mixtures of alcohols.

In the past it has been necessary to prepare esters by some such means as esterification of an alcohol with an acid, or by alcoholysis. In the latter case, it is necessary to make use of an ester which has previously been prepared by esterification, so it is readily seen that the former method has been basic for preparing esters.

We are aware of the fact that it has recently been claimed (English Patent 282,448) that it is possible to obtain condensation products by passing alcohols over suitable catalysts. According to this process, however, which consists of passing an alcohol, such as ethyl alcohol, at ordinary pressure and at a temperature of 400–500° C. over catalysts such as barium oxide, magnesia, lime, manganese oxide, magnesium alcoholate, and sodium alcoholate, there is obtained a mixture of alcohols, acids, esters, acetals, acetone, and acetaldehyde. According to a specific example, when ethyl alcohol was passed over a catalyst composed of barium oxide, the products consisted of higher alcohols, such as butyl alcohol, acids, esters, such as ethyl acetate, acetals, particularly diethyl acetal, and aldehydes. Our new process of preparing esters has very distinct advantages over this process, in that we are able to obtain much higher yields of esters together with only relatively small amounts of other materials which may readily be separated from the main product and which may be utilized for other purposes, thereby reducing the operating losses to a minimum.

The formation of esters from alcohols under the influence of certain catalysts at high temperatures may be regarded as taking place as follows:

$$2C_2H_5OH = C_2H_5OOC.CH_3 + 2H_2$$
$$2C_4H_9OH = C_4H_9OOC.C_3H_7 + 2H_2$$
$$C_2H_5OH + C_4H_9OH = C_2H_5OOC.C_3H_7 + 2H_2$$

While we do not know the exact mechanism of the reaction, it appears that the alcohol may be first dehydrogenated into the corresponding aldehyde, two molecules of which, under certain conditions, then condense to form an ester. This theory is at least partially corroborated by the fact that Tistschenko (Jour. Russ. Phys. Chem. Soc. 38 ii, 355—418, 482—550) found that it was possible to obtain esters such as ethyl acetate from acetaldehyde or propyl propionate from propaldehyde, by the use of an aluminium alkoxide catalyst. More recently, modifications of this process have been patented by Imray (British Patent 1288—1915) and Mugdan and Herrmann (U. S. Patent 1,459,852). We have found, however, that when an aldehyde and an alcohol are passed under similar operating conditions over catalysts of the character hereinafter described, much lower yields of esters are obtained from the aldehyde than from the corresponding alcohol. We have also found that the amount of high-boiling material, other than ester, formed during the condensation process is greatly reduced by the use of an alcohol as the raw material.

As has previously been pointed out, esters can be produced from primary alcohols, such as ethanol and butanol, by means of a number of different catalysts. In a copending application, U. S. Serial No. 475,117 filed August 13, 1930, we have described catalysts suitable for this purpose, comprising metal uranyl carbonates and metallic silver. We have now discovered that more advantageous results may be obtained by incorporating certain other materials in our original catalyst mixtures. Our new and improved catalysts give higher yields, remain active longer and permit the reaction to be carried out at materially lower pressures. Examples of a number of the catalyst compositions which give these improved results are shown in the table below.

Table I

| Catalyst No. | Initial composition of catalyst |
|---|---|
| A—125—M | $Ba_2UO_2(CO_3)_3.Ag_2CO_3.3/_{10}NiCO_3.2Al(OH)_3$ |
| A—130—M | $Ba_2UO_2(CO_3)_3.Ag_2CO_3.Fe(OH)_3.Al(OH)_3$ |
| A—131—M | $Ba_2UO_2(CO_3)_3.Ag_2CO_3.Co(OH)_2.Al(OH)_3$ |
| A—121—M | $Ba_2UO_2(CO_3)_3.Ag_2CO_3CuCO_3.Al(OH)_3$ |

As will be seen from a consideration of the above table, the essential constituents of these catalysts are metal uranyl carbonate, the term "metal" being applied generally to metals other than uranium; silver carbonate, a compound of a metal belonging to the first long period of Mendelejeff's periodic table; and a hydroxide of an element or elements occurring in groups IIb to IV inclusive of the periodic table. (By group IIb is meant the subgroup of group II which contains zinc, cadmium, and mercury.) The ratios of the constituents of the catalyst mixture may be varied within fairly wide limits without seriously affecting the activity of the catalyst. The metals to be used in the metal uranyl carbonate may be derived from an element or elements occurring in groups I, II and IV of Mendelejeff's periodic table. The elements which we have successfully used for this purpose include: calcium, strontium, barium, magnesium, zinc, silver, and lead.

In addition to the silver compound, metal uranyl compound, and compound of the first long period of the periodic table (which includes the fourth and fifth periods) such as copper, nickel, iron or cobalt, we have found it advisable to have present another compound such as a hydroxide of an element or elements occurring in groups IIb to IV inclusive of the periodic table. Compounds of this type which we have successfully used are: beryllium, aluminium, thorium, and zirconium hydroxides. These metal hydroxides appear to aid chiefly in hardening the catalyst, altho there is some indication that they also serve to some extent as promoters. Even without this effect, however, a catalyst containing a metal hydroxide of the character specified lasts much longer than one not containing such a material.

A method of preparing our catalyst may be illustrated by the following example. It is distinctly understood, however, that we do not confine ourselves to this exact method nor to the amounts of materials mentioned. One-fifth gram mol of uranyl nitrate, $UO_2(NO_3)_2.6H_2O$; two-fifths gram mol of barium nitrate, $Ba(NO_3)_2$; two-fifths gram mol of silver nitrate, $AgNO_3$; two-fifths gram mol of copper nitrate, $Cu(NO_3)_2$; and one-fifth gram mol of aluminium nitrate, $Al(NO_3)_3.9H_2O$ are dissolved in four liters of distilled water. To this solution is next added a solution of 175 grams of potassium carbonate, $K_2CO_3$, in two liters of water. The resulting precipitate is then washed by decantation with distilled water until free from nitrate ions. The precipitate is filtered, pressed dry, and then slowly dried at 50° C. for 48 hours. The dried cake thus formed is broken up to 8-14 mesh and used for the catalytic conversion of alcohols to esters.

Instead of effecting the precipitation as described above to give the carbonate form, the corresponding hydrate or phosphate, etc., compounds may be likewise obtained.

If found more convenient, for any reason, our improved catalysts may be prepared by thoroughly mixing in the form of a paste or otherwise, the requisite amounts of the finely divided materials entering into their composition. For example, precipitated barium uranyl carbonate and aluminium hydroxide may be thoroughly mixed with silver carbonate and copper carbonate and the procedure outlined above, then followed. Satisfactory results may also be obtained by substituting the required amount of colloidal silver or colloidal metal of the first long period of the periodic table for the salts of these two metals. After thorough mixing, the preparation of the catalyst mixture may then be completed as hereinbefore described.

A number of methods may be employed for preparing and sending the alcohol or alcohols over the catalyst. One method of accomplishing this is to force the said alcohol or alcohols over the catalyst by means of carbon dioxide or other inert gas under pressure. The liquid alcohol is in this process vaporized directly in the catalyst chamber. A second method of carrying out the process which we have found to be satisfactory is to bubble carbon dioxide gas thru the alcohol or alcohols which it is desired to convert, and pass the vapor thus obtained over the catalyst.

In order to effect the conversion of alcohols to esters by our new method, the alcohol or alcohols, alone or mixed with carbon dioxide or other inert gas or gases, is passed over catalysts prepared as described, at temperatures preferably from 250° to 400° C., using a pressure of preferably from about 1 to about 200 atmosphere. While it is possible to use temperatures outside of the range specified, we have found, that, as a rule, temperatures below 250° C. give low conversions and temperatures above 400° C. give too many side reactions. We may, however, use temperatures as low as 200° C. and as high as 450° C.

The table given below shows data on the conversion of n-butyl alcohol to butyl butyrate under different conditions and with different catalyst combinations. In each case, 20 c. c. of catalyst having the initial composition shown in Table I was used. It should be pointed out that the character of the catalyst shown in Table I above, changes considerably under the conditions under which the operation is carried out. At the temperatures employed, the silver compound and the metal compounds of the first long period of the periodic table used are largely reduced to their corresponding metallic forms.

Table II

| Run | Catalyst | Pressure lbs. per sq. in. | Temp. °C. | Rate of flow c. c. per hr. | Ester formed grs. per 100 c. c. condensate |
|---|---|---|---|---|---|
| 1 | A—125—M | 200 | 300 | 30 | 7.78 |
| 2 | A—125—M | 58 | 300 | 48 | 37.43 |
| 3 | A—130—M | 300 | 300 | 30 | 15.73 |
| 4 | A—131—M | 300 | 300 | 30 | 22.22 |
| 5 | A—131—M | 200 | 300 | 30 | 24.77 |
| 6 | A—131—M | 50 | 300 | 23 | 20.63 |
| 7 | A—121—M | 50 | 300 | 35 | 34.74 |
| 8 | A—121—M | 50 | 300 | 40 | 47.20 |

We have found that it is possible to omit from our catalyst combinations either the silver compound or the compound of the metal appearing in the first long period of the periodic table and still obtain conversion of the alcohol or alcohols to the corresponding ester. In case, however, one of these constituents is omitted, much lower conversions, and generally, more unsatisfactory results, are obtained. Omission of the silver compound, as a rule, gives poorer conversions than when the metal compound of the first long period of the periodic table is omitted instead of the silver compound. For example, a catalyst composed initially of barium uranyl carbonate and nickel carbonate, gives lower conversions than one composed initially of barium uranyl carbonate and silver carbonate. A catalyst prepared in a similar manner but containing initially, in addition to barium uranyl carbonate, both silver carbonate and nickel carbonate, gives much higher yields and generally more satisfactory results than either of the former two combinations.

In the examples described above, we have only shown specific data relating to the production of butyl butyrate from butyl alcohol. It is distinctly understood, however, that our process applies also to the production of other similar esters such as ethyl acetate, propyl propionate, ethyl butyrate, ethyl propionate, propyl butyrate, etc.; esters of the latter type being obtained when a mixture of alcohols is passed over our new catalyst.

It is understood also that in preparing our catalyst combinations, we may include, if desired, more than one of each of the different classes of materials.

This application is a division of our co-pending application U. S. Serial No. 278,334, filed May 16, 1928, now Patent No. 1,817,899 of which co-pending applications Serial Nos. 537,500 and 537,501 now Patents Nos. 1,869,761 and 1,869,762 are also divisions.

Now having described our invention, what we claim as new and novel is:

1. Catalysts for the conversion of primary alcohols having more than one carbon atom to esters, which comprise initially metal uranyl compounds, a silver compound, and a compound of a metal selected from the group consisting of copper, nickel, iron and cobalt.

2. Catalysts for the conversion of primary alcohols having more than one carbon atom to esters, which comprise metal uranyl compounds, metallic silver and a metal selected from the group consisting of copper, nickel, iron and cobalt.

3. Catalysts for the conversion of primary alcohols having more than one carbon atom to esters, which comprise metal uranyl carbonates, metallic silver and a metal selected from the group consisting of copper, nickel, iron and cobalt.

4. Catalysts for the conversion of primary alcohols having more than one carbon atom to esters, which comprise initially metal uranyl carbonates, a silver compound, and a compound of a metal selected from the group consisting of copper, nickel, iron and cobalt.

5. Catalysts for the conversion of primary alcohols having more than one carbon atom to esters, which comprise initially uranyl compounds of metals selected from the group consisting of calcium, strontium, barium, magnesium, zinc, silver and lead; silver carbonate, and a metal selected from the group consisting of copper, nickel, iron and cobalt.

6. Catalysts for the conversion of primary alcohols having more than one carbon atom to esters, which comprise initially metal uranyl compounds, a silver compound, compounds selected from the group consisting of copper, nickel, iron and cobalt; and hydroxides of metals selected from the group consisting of aluminium, thorium, zirconium and beryllium.

7. Catalysts for the conversion of primary alcohols having more than one carbon atom to esters, which comprise metal uranyl compounds, metallic silver, metals selected from the group consisting of copper, nickel, iron and cobalt; and hydroxides of metals selected from the group consisting of aluminium, thorium, zirconium and beryllium.

8. Catalysts for the conversion of primary alcohols having more than one carbon atom to esters, which comprise initially uranyl carbonates of metals selected from the group consisting of calcium, strontium, barium, magnesium, zinc, silver and lead; a silver compound, compounds selected from the group consisting of copper, nickel, iron and cobalt; and hydroxides of metals selected from the group consisting of aluminium, thorium, zirconium and beryllium.

9. Catalysts for the conversion of primary alcohols having more than one carbon atom to esters, which comprise uranyl carbonates of metals selected from the group consisting of calcium, strontium, barium, magnesium, zinc, silver and lead; metallic silver, metals selected from the group consisting of copper, nickel, iron and cobalt; and hydroxides of metals selected from the group consisting of aluminium, thorium, zirconium and beryllium.

JEROME MARTIN.
IGNACE J. KRCHMA.